(No Model.) 7 Sheets—Sheet 1.
W. J. PERKINS.
SHINGLE SAWING MACHINE.

No. 348,050. Patented Aug. 24, 1886.

(No Model.) 7 Sheets—Sheet 2.

W. J. PERKINS.
SHINGLE SAWING MACHINE.

No. 348,050. Patented Aug. 24, 1886.

WITNESSES
INVENTOR Willis J. Perkins
ATTORNEY (No Model.) 7 Sheets—Sheet 5.
W. J. PERKINS.
SHINGLE SAWING MACHINE.

No. 348,050. Patented Aug. 24, 1886.

WITNESSES
INVENTOR
Willis J. Perkins
By Leggett & Leggett ATTORNEY

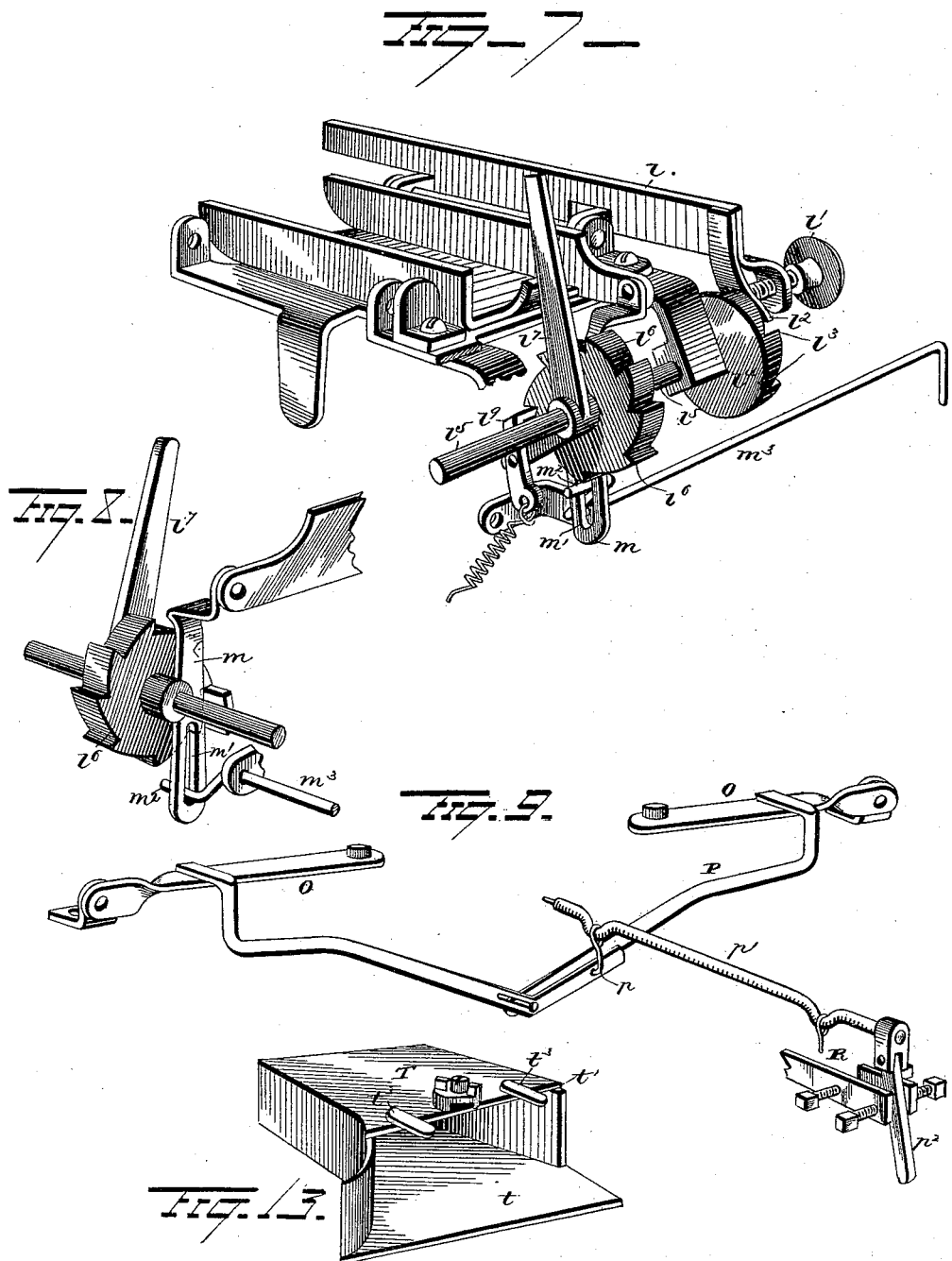

(No Model.) 7 Sheets—Sheet 7.
W. J. PERKINS.
SHINGLE SAWING MACHINE.
No. 348,050. Patented Aug. 24, 1886.
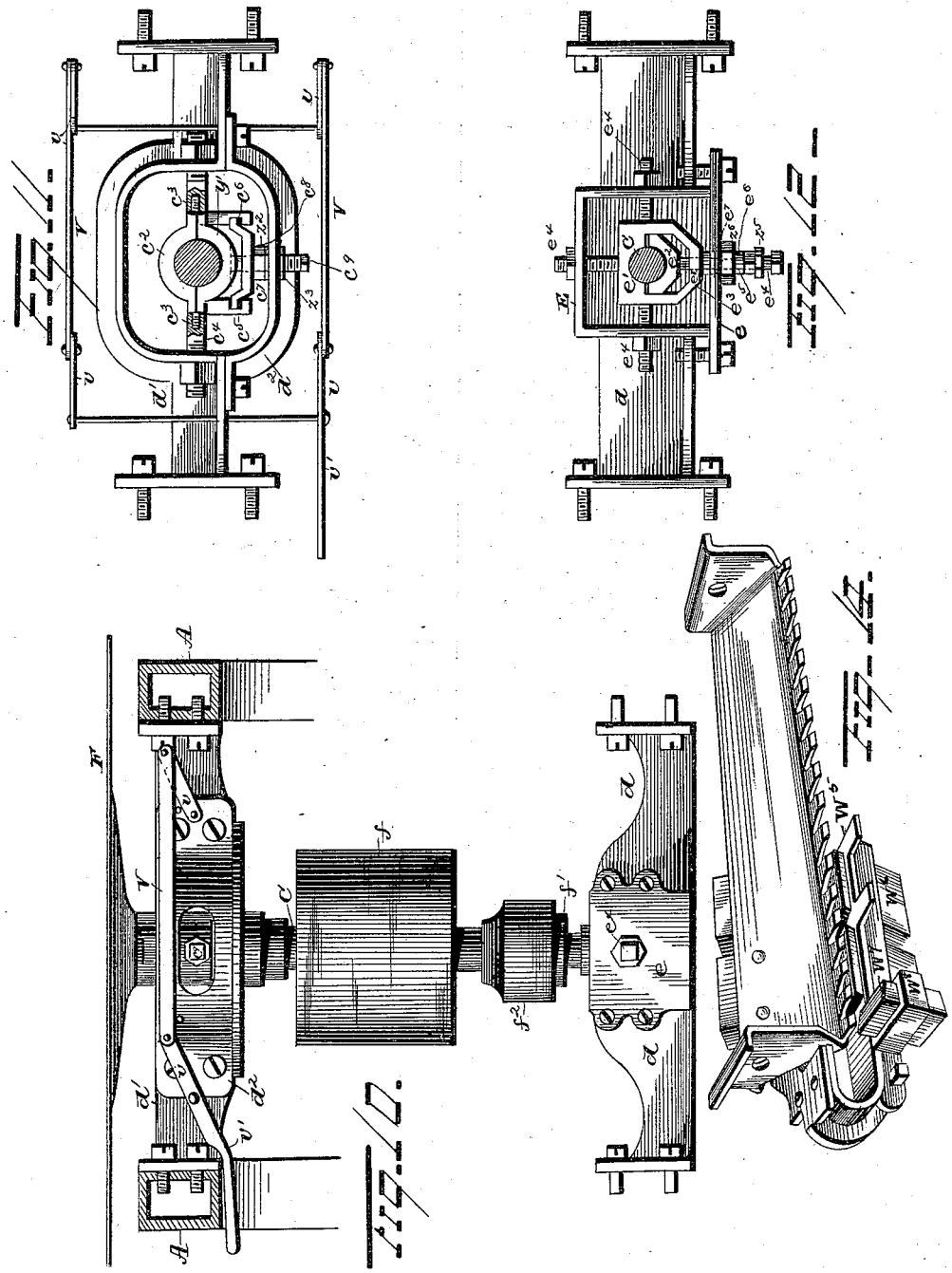
WITNESSES
INVENTOR
Willis J. Perkins
By Leggett & Leggett
ATTORNEY

UNITED STATES PATENT OFFICE.

WILLIS J. PERKINS, OF GRAND RAPIDS, MICHIGAN.

SHINGLE-SAWING MACHINE.

SPECIFICATION forming part of Letters Patent No. 348,050, dated August 24, 1886.

Application filed July 30, 1884. Renewed August 17, 1885. Serial No. 174,643. (No model.)

*To all whom it may concern:*

Be it known that I, WILLIS J. PERKINS, of Grand Rapids, in the county of Kent and State of Michigan, have invented certain new and useful Improvements in Shingle-Machines; and I do hereby declare the following to be a full, clear, and exact description of the invention, such as will enable others skilled in the art to which it appertains to make and use the same.

My invention relates to an improvement in shingle-machines, the object of the same being to remedy, as far as possible, the defects which exist at present in machines of this class, and provide an effective, durable, and economical machine.

The objects of my present invention, more particularly stated, are, first, to provide improved boxes which are capable of easier adjustment, whereby the saw may be more readily ranged; a further object being to provide improved mechanism for operating the carriages and dogs, whereby the driving-power shall be applied in direct opposition to the greatest resistance, and whereby either carriage may be stopped at a definite point; a further object being to provide a simple adjustment and control of the tilt-table; a further object being to provide mechanism whereby a spalt may be cut down closer than heretofore, thereby saving timber; a further object being to provide means for keeping the belt out of the way of the shingle, and for increasing the safety and comfort of the operator.

With these ends in view my invention consists in certain features of construction and combinations of parts, as will be hereinafter described, and pointed out in the claims.

Figure 1:
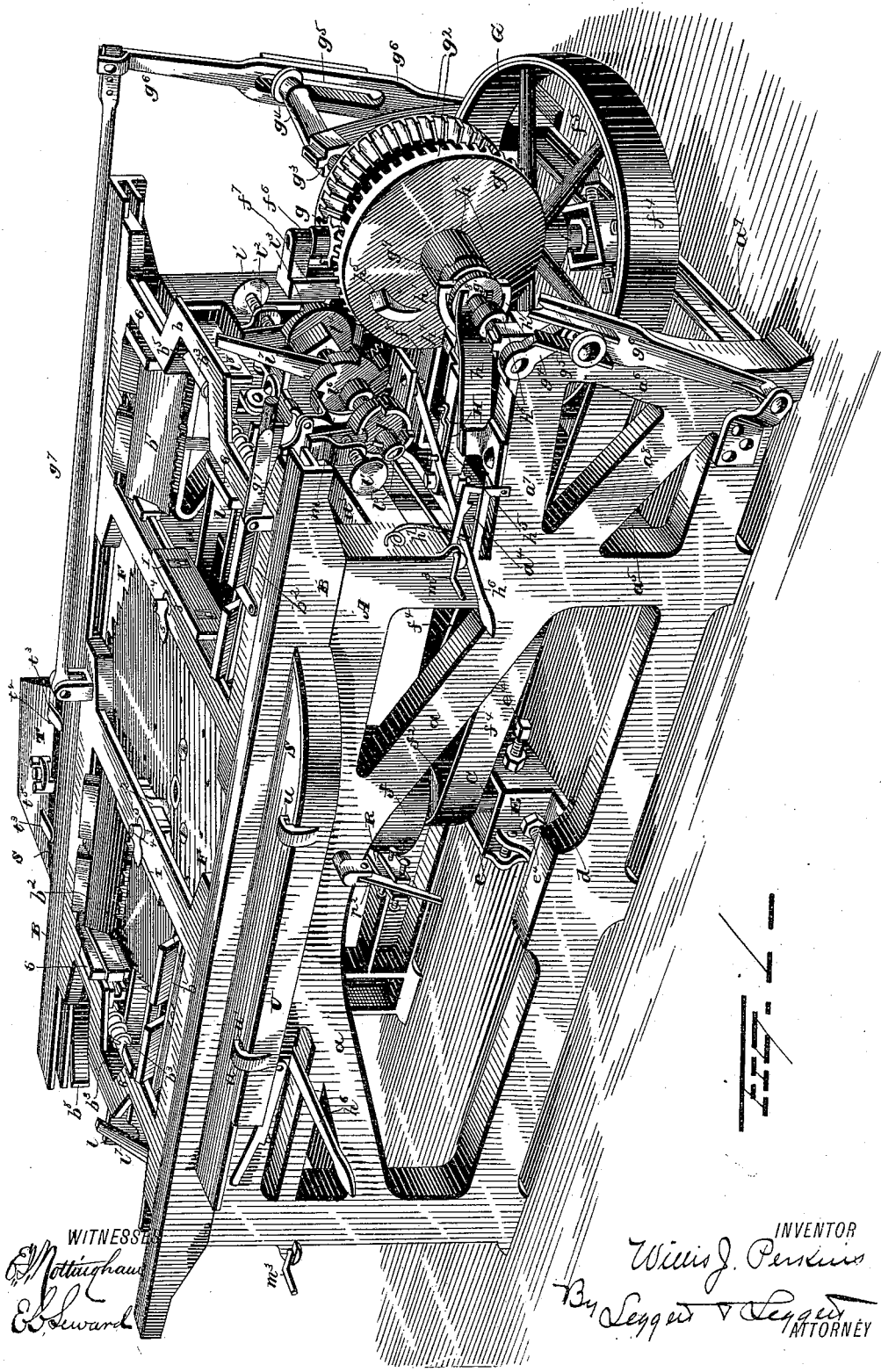
Figure 2:
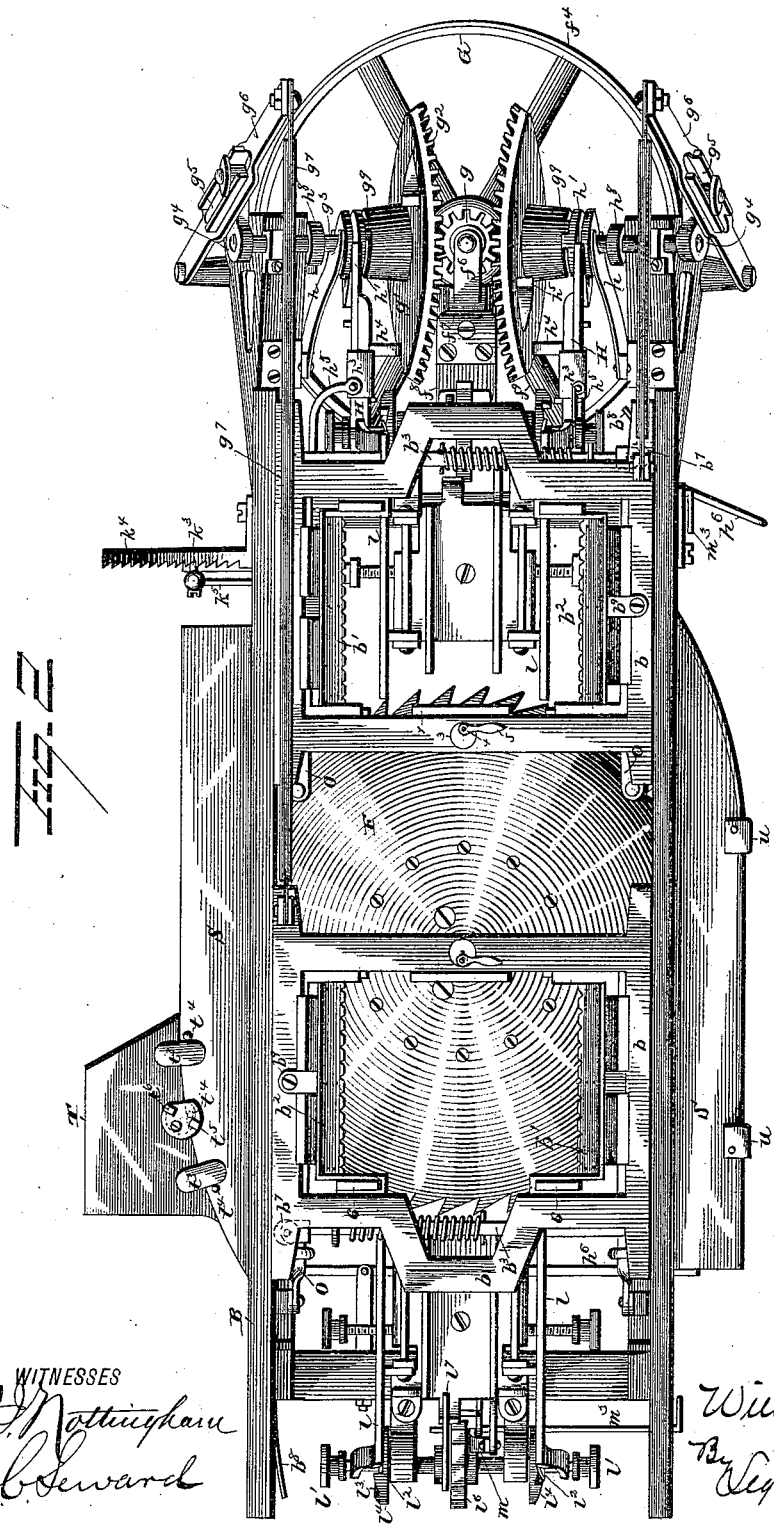
Figure 3:
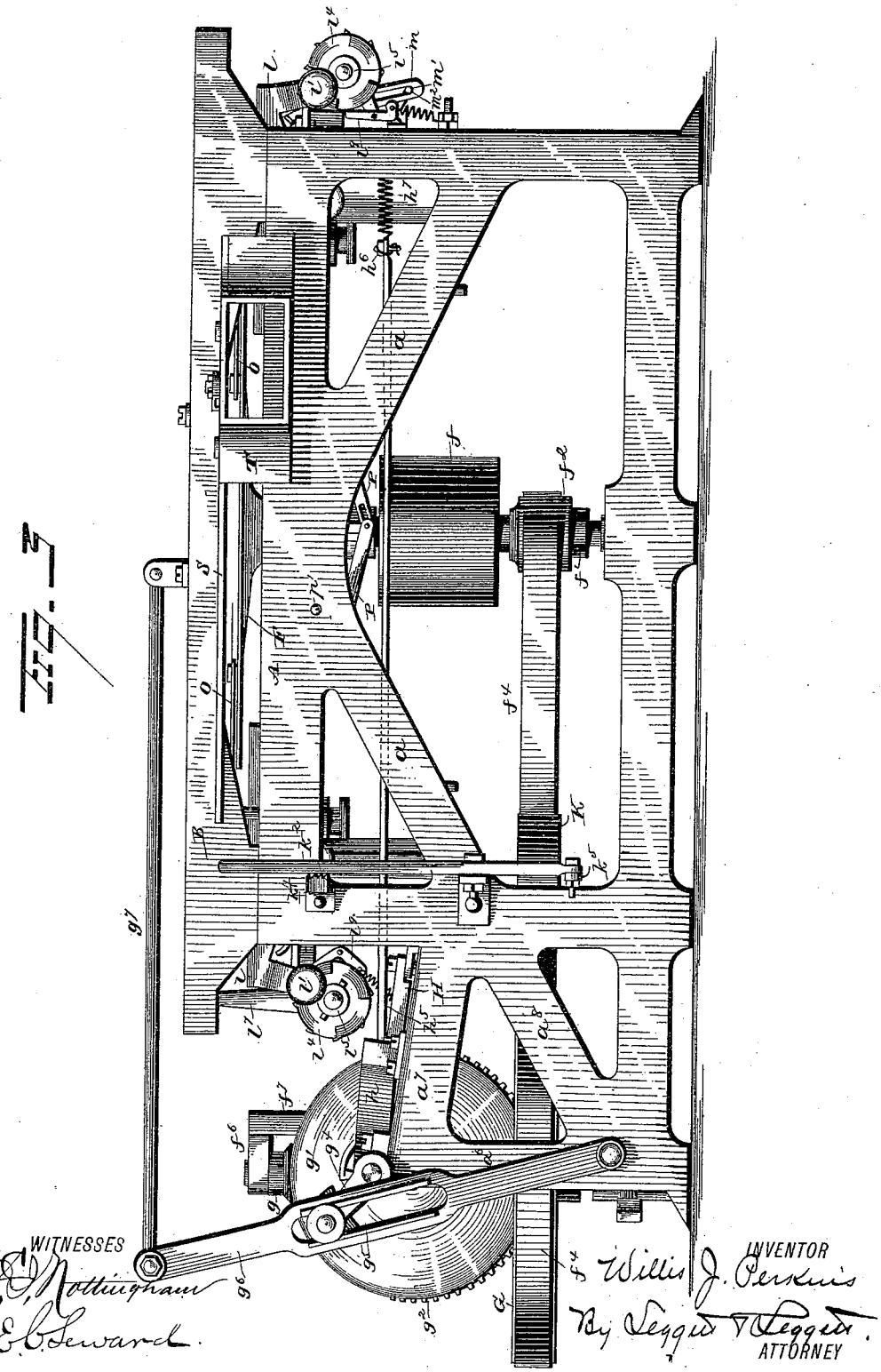
Figure 4:
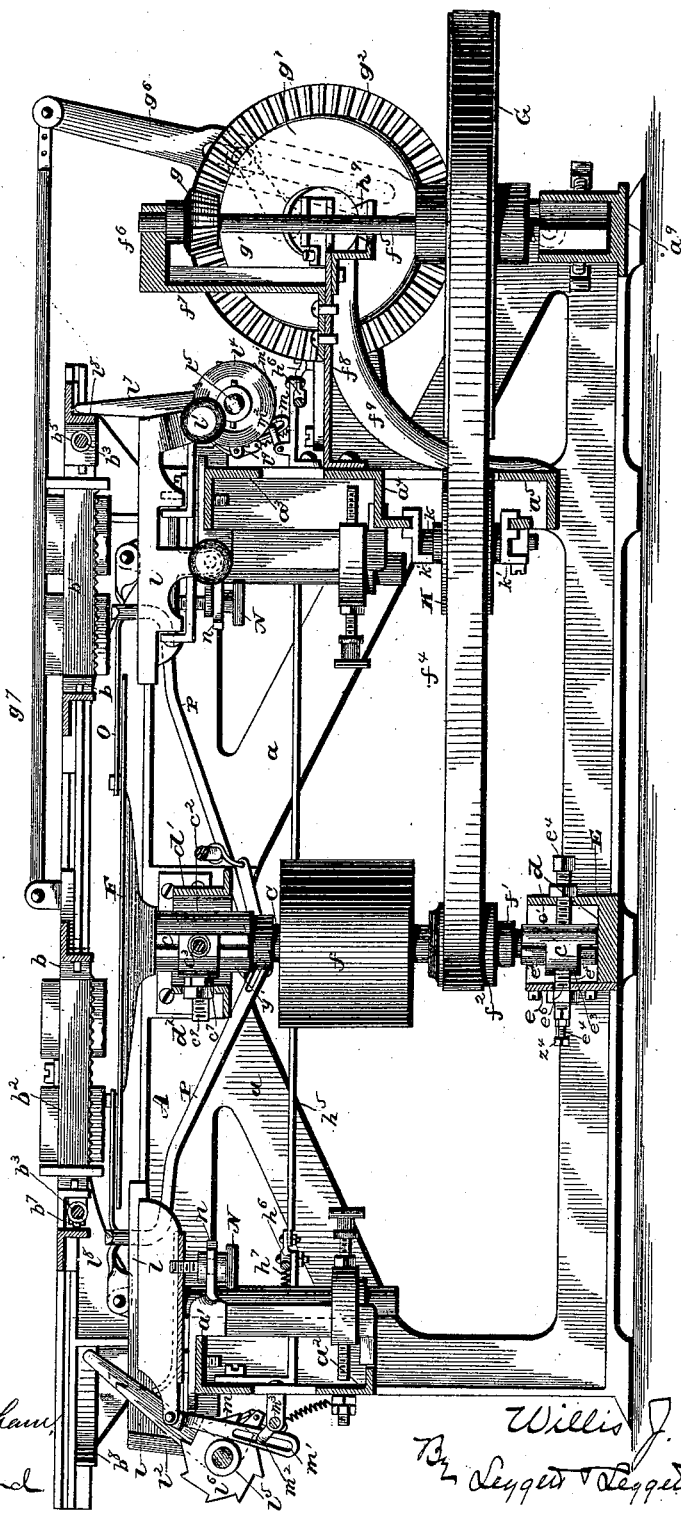
Figure 5:
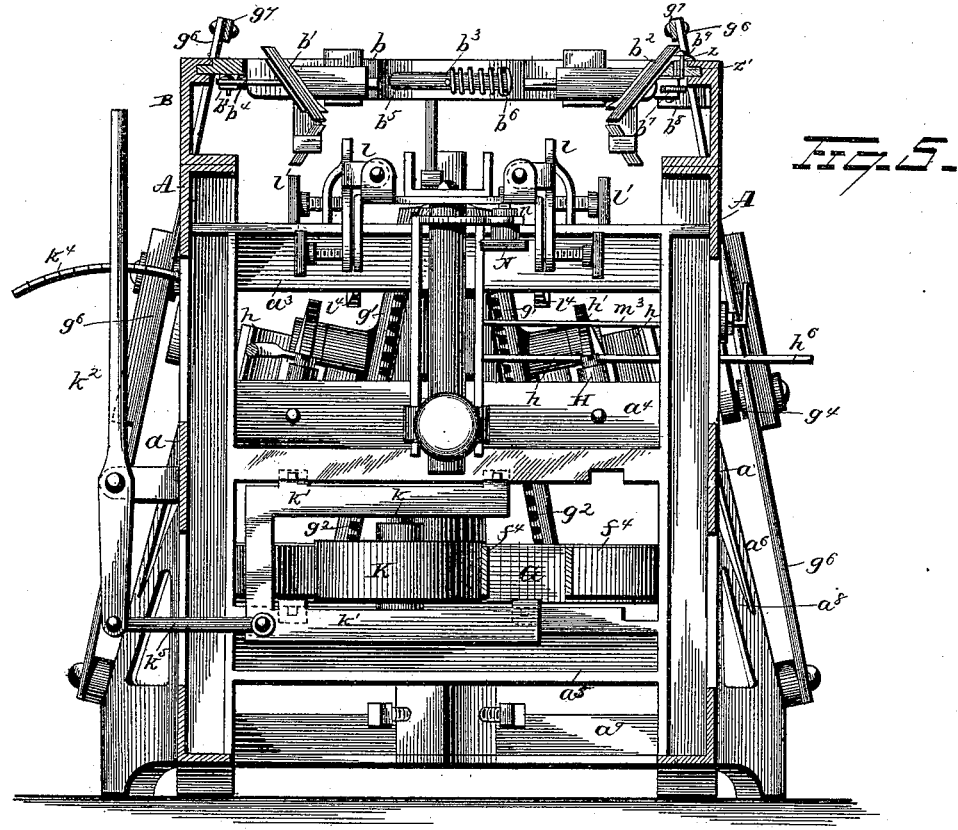
Figure 6:
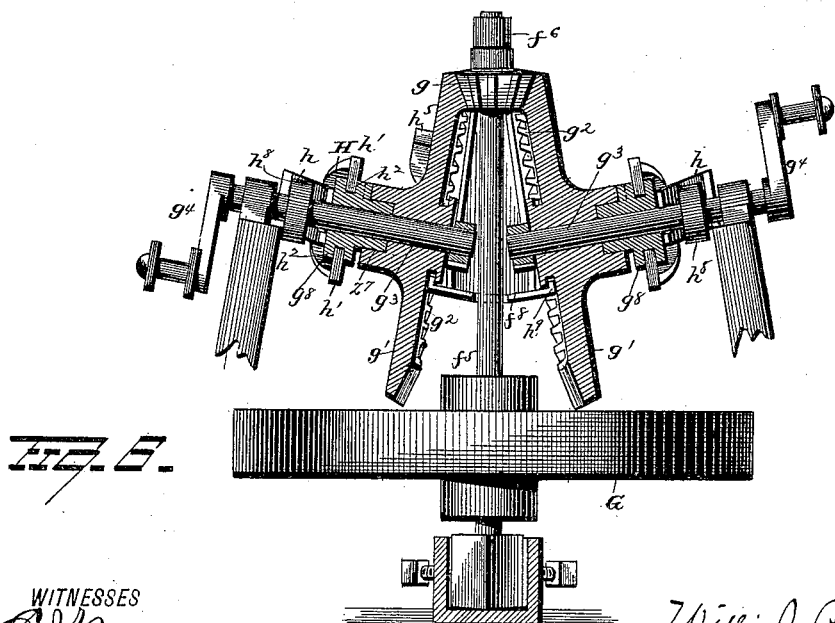

In the accompanying drawings, Figure 1 is a view of the machine in perspective. Fig. 2 is a plan view. Fig. 3 is a side elevation. Fig. 4 is a vertical longitudinal section. Fig. 5 is a vertical transverse section through the belt-tightener. Fig. 6 is a vertical transverse section through the feed-operating shaft. Fig. 7 is a detached view of one end of the tilt-table and operating mechanism. Fig. 8 is a detached view of the ratchet-toothed wheel, operating-arm, and guide. Fig. 9 is a view of a portion of the machine, showing the saw-guides and mechanism for operating the same. Fig. 10 is a detached view of the arbor and boxes. Fig. 11 is a view in detail of the parts of the upper box. Fig. 12 is a view in detail of the lower box. Fig. 13 is a detached view of one sawdust-spout, showing its locking-disk; and Fig. 14 is a detached perspective view of a dog embodying new features.

The frame-work of the machine consists of the rectangular portion A, provided with side braces, $a$, similarly situated on each side, a pair of cross beams or girders, $a'\ a^2$, at one end, these girders being also joined to each other, a similar pair of cross beams or girders, $a^3\ a^4$, at the opposite end, and a separate cross-girder, $a^5$, at this last-named end near the base. The stringers of the frame A are produced at one end and gradually spread apart, and together with uprights $a^6$, connecting-beams $a^7$, braces $a^8$, and cross-girder $a^9$, form an extension to the main frame for purposes which will hereinafter appear. The base of the frame A and the extension is provided with eight feet, more or less. The carriage-ways B are secured to the upper parallel rails of the frame A by bolts, screws, or other suitable means.

The carriages $b$ are similar in general construction to the carriages usually used on this class of shingle-machines, but differ in respect to the mechanism for operating the movable dog $b'$, the laterally-adjustable head-block or stationary dogs $b^2$, and the adjustable wooden blocks on the front and rear of the carriage for preventing spalt from getting between the carriage and saw, as follows: A crank-arm, $b^3$, is connected at one end with a lug, $b^4$, extending outwardly from about the center of the movable dog $b'$, and is supported by passing through perforations $b^5$ and $b^6$, formed in depending lugs or flanges on the carriage-frame and allowed a sliding motion in said perforations. The other end of the crank-arm $b^3$ extends to a point near the carriage-way, and is provided with an anti-friction roller, $b^7$, which engages a cam, $b^8$, on the inside of the way as the carriage reaches its backward limit, and thereby slides the arm $b^3$, and dog $b'$, attached thereto, backward. A spiral spring on the arm $b^3$, between its supports, tends to automatically throw the dog $b'$ forward into engagement with the bolt as soon as the arm $b^3$ is released from the cam $b^8$.

The head-block or stationary dog $b^2$ is constructed to be adjusted at different distances from the movable dog $b'$ by means of a spring-arm, $b^9$, which is secured to the back of the dog at its center and extends over the end of the carriage, and is provided with a downwardly-extending catch or stud, $z$, which latter is adapted to enter one of a series of perforations, $z'$, in the carriage-frame, and thus lock the dog against displacement; or the arm $b^9$ may be constructed without spring, and provided with a series of perforations adapted to register with a single perforation in the carriage-frame, and a bolt or set-screw used in the place of the catch or stud $z$, above mentioned, to lock the dog in the required adjustment. This adjustment of the head-block is an important feature, as it often happens that the bolt is too short to be held by the movable dog, and it is of great importance, too, that this adjustment should be simple and quickly made. The above-described devices for this purpose, especially the spring-arm, are extremely simple, and it only requires that the operator lift the catch out of engagement with one of the holes in the carriage-frame and slide the dog inward, the spring-arm causing the catch to automatically engage the next perforation. The front of the carriage is provided centrally with a wooden block, which is held by means of metal clamps or a metal plate, 2, in a vertical or nearly a vertical position, the lower end projecting downward from the metal portion of the carriage and resting lightly in contact with the upper side of the saw, thereby preventing spalt from wedging between the carriage and saw-plate, and also to prevent slivers or spalt from flying in the face of the sawyer. The block 1 is vertically adjustable by means of a rotating cam, 3, operated by a vertical rod, 4, having a crank-handle, 5, on its upper end; or other convenient devices may be employed for adjusting the block. The rear of the carriage is also provided with blocks 6, inserted in suitable sockets formed on the ends of the head and tail dogs, respectively, said blocks being wedged therein sufficiently tight to hold their positions by frictional contact. The lower ends of these blocks 6 rest lightly in contact with the saw-plate, and prevent the spalt, slivers, &c., from getting between the rear of the carriage and the saw. The block 1 is constructed adjustable for the purpose of relieving the saw when it is desired to remove the same. The above-described blocks also serve to steady the saw, and assist to prevent the same from touching the metal dogs.

In machines heretofore employed in the manufacture of shingles it has been impossible to utilize the entire bolt after the latter has been cut to a certain size, and consequently about one shingle to every bolt cut is lost. To remedy this defect, and also to increase the capacity of the machine, I have provided the rigid and movable dogs with auxiliary dogs (shown in Fig. 14,) which latter are located below and in close proximity to the saw, and are adapted to receive the spalt or waste end of the bolt and hold it until it has been sawed up. The auxiliary dogs $W^5$ are made of metal and rigidly secured to the lower faces of the rigid and movable dogs, and are provided throughout their entire length with vertical sockets, in which the wooden blocks $W^6$ are driven. These blocks $W^6$, when first placed in position, abut against the lower faces of the rigid and movable dogs. As soon, however, as the carriage has passed over the saw, these blocks are cut off even with the lower face of the saw, and prevent the saw from wabbling, and also bear against the opposite ends of the spalt or waste portion of the bolt and hold it in position to engage the saw as the carriage is moved. After these blocks wear away slightly by constant contact with the saw, they are driven up and again cut off, and so on until the blocks are worn away, when they are taken out and replaced by new ones. The auxiliary dogs rest slightly outside of the inner edges of the rigid and stationary dogs, and hence they only grasp the bolt when the upper edges of the latter come below the lower edge of said stationary and rigid dogs. These auxiliary dogs are also provided, near their outer ends, with the upwardly-projecting abutments $W^7$, which latter prevent the bolt from moving sidewise while in contact with the saw. These abutments are secured in the adjustable sleeves $W^8$, secured to the auxiliary dogs. The stationary and rigid dogs are in contact with the upper surface of the saw. This cuts the stock very close, but there is still sufficient material left to form another shingle. This spalt or waste portion of the bolt now drops onto the tilt-table and the ends thereof are grasped by the auxiliary dogs. The carriage now moves toward the saw, and the upper surface or shim of the bolt is sawed off, leaving the last shingle between the auxiliary dogs, from which it is afterward discharged.

The mechanism for reciprocating the carriages will be explained hereinafter.

The saw-arbor C is journaled in boxes $c^2$ and $c'$, secured to cross-beams or girders $d$ and $d'$, extending across the lower and upper portions of the main frame, about midway between the ends. The upper cross-beam, $d'$, is constructed in two parts, the main section, $d'$, curving horizontally at its central portion, and the lesser section, $d^2$, is curved and fitted at its ends to be bolted to the section $d'$. Thus there will be space inclosed by the central portions of the beam $d'$ when the two sections are bolted together. The upper box, $c^2$, is centrally located in this space and secured in position by diametrically-opposite ball-joints $c^3$, formed with the ends of the screws $c^4$, the latter passing through threaded perforations in the beam or girder $d'$, by means of which screws the upper end of the arbor may be lined laterally, while the arbor is left free and will line itself longitudinally when the machine is set plumb. One half-section, $y$, of the box $c^2$ is provided with lugs $c^5$, which extend horizontally parallel and sufficiently far apart to admit the other section, $y'$, of the box $c^2$. The ends of the lugs $c^5$ are provided with vertical grooves $c^6$, in which the edges of the bail $c^7$ fit. The bail $c^7$ is provided with a central threaded perforation, $c^8$, in which an adjusting-screw, $c^9$, operates, said screw being provided with jam-nuts $z^2$ and $z^3$. The inner end of the screw $c^9$ engages the outer surface of the removable section $y'$ of the box $c^2$, while the outer end of the said screw is squared, and extends through a slot in the lesser section $d^2$ of the cross-beam $d'$, whereby the screw may be turned without removing the section. The removable section $y'$ of the box $c^2$ is recessed on its opposite edges to receive the lugs $c^5$ and prevent the section from falling out of place when the screw $c^9$ is loosened therefrom. By this construction the wear within the box $c^2$ may be taken up by turning the screw $c^9$, the nuts $z^2$ and $z^3$ serving to lock the screw in the desired adjustment, and the arbor C may be removed from the box $c^2$, without disturbing the position of the box, by simply loosening the screw $c^9$ from its engagement with $y'$, sliding the bail $c^7$ out of the grooves, and removing the box-section $y'$.

The boxes of a shingle-machine are both, in general, difficult of access, but particularly the lower one, being surrounded by a large bridge-pot, and of necessity having adjustment in four ways. In order to make these four adjustments without changing the box on the arbor, or to change the box on the arbor without disturbing the adjustment of the arbor, I provide the following construction: One side, $e$, of the bridge-pot E is removable, being secured to the lower cross-girder, $d$, by bolts or other suitable means. One section, $e'$, of the lower box is provided with a semi-circular, hexagonal, or other shaped band, $e^3$, formed integral therewith or rigidly secured thereto, adapted to embrace the box-section $e^2$ and allow the latter sufficient play to take up any amount of wear that may take place in the box or arbor. Three of the adjusting-screws $e^4$ pass through the sides of the bridge-pot and engage the box on opposite sides. The adjusting-screw $e^4$, however, which passes through the removable side $e$ of the bridge-pot, passes centrally through a threaded perforation, $e^5$, in a screw, $e^6$, which latter passes through a threaded perforation, $e^7$, in the side $e$. The inner end of one of the screws $e^4$ passes through a slot, $e^8$, in the band $e^3$ and engages the box-section $e^2$, and the end of the screw $e^6$ engages the outer surface of the band $e^3$. The screws $e^4$ and $e^6$ are provided with check-nuts $z^5$ and $z^6$, respectively. Thus by loosening the nut $z^5$ the screw $e^4$ is free to operate and take up wear without disturbing the adjustment of the arbor, while, on the other hand, by loosening the nut $z^6$ the screw $e^6$ may be operated and the adjustment of the arbor accomplished without disturbing the relative positions of the box-sections, as screw $e^4$ will turn with $e^6$, and the same relative positions on $e^8$ and $e^2$ are maintained, and the box may be removed from the arbor and arbor from the bridge-pot by removing the side $e$ and sliding the box off the end of the arbor. The arbor C is provided with the saw F, the band-pulley $f$, by means of which motion is communicated to the saw, and with the feed-pulley $f'$.

The saw is changed on a shingle-machine, usually, four times a day. From its location it will be seen that it is a difficult matter to get it out and in without dulling it. For the purpose of rendering the labor of shifting light and saving time, I propose the following device, (represented in Figs. 10 and 11:) On both sides of the arbor-head and just beneath the saw a wooden rod or bar, V, is placed, located transversely on the machine. The rods V are secured at their ends to the ends of arms $v$, the latter being pivotally secured at their opposite ends to the cross-girder rails of the main frame or to other suitable supports. An operating-handle, $v'$, is secured to one of the arms $v$, whereby the arms are rocked on the pivotal points, thereby elevating and depressing the rods V. If, now, the saw be loose on the arbor-head, the rods V will lift the saw from the head and leave it free to slide out horizontally, and the handle $v'$, being locked by any convenient means in a position to hold the rods V elevated, another or the same saw, after it has been sharpened or repaired, may be slid over the arbor-head and lowered into position by the same device. When the rods V are depressed, they are entirely out of the way of the saw.

It is desirable to have more than one rate of feed to the shingle-machine carriage, for increasing or diminishing the day's cut, for suiting a skillful operator, or for different grades of timber. The space at the lower end of the arbor being limited, and all changes, to be practicable, requiring to be rapidly made, the accomplishment of the object by removing one pulley from the arbor and the substitution of another in its place is objectionable. To overcome the objection and accomplish the object, I provide a slip-pulley, $f^2$, which is provided with a central perforation sufficiently large to admit of its being slipped over the pulley $f'$, and secured to the shaft by a feather-key and set-screw, the pulley $f'$ being rigidly secured to the arbor. The slack of the feed-band $f^4$, caused by the substitution of a lesser for a greater pulley, is taken up by the belt-tightener, which will be hereinafter described. The belt or band $f^4$ extends from the pulley $f'$ or $f^2$ about the large band-pulley G. The pulley G is secured on a vertical shaft, $f^5$, the lower end of which is journaled in suitable bearings on a cross-girder, $a^9$, connecting the ends of the extended portions of the stringers at the base of the main frame. The upper end of the shaft $f^5$ is journaled in the end of a horizontal arm, $f^6$, secured to one upright, $f^7$, the latter being secured to the end of a horizontal support, $f^8$, bolted to the central cross beam or girder at the end of the main frame, and supported rigidly in its position by means of braces $f^9$, extending from the end of the support below the upright $f^7$ to the lower cross-beam on the end of the frame A. The upper end of the shaft $f^5$ carries a bevel-faced pinion, $g$. Two annular gear-wheels, $g'$, adapted to mesh with the pinion $g$, are mounted near the inner ends of two oblique shafts, $g^3$, and on opposite sides of the shaft $f^5$. The inner ends of the shafts $g^3$ are journaled in boxes secured to the end of the support $f^8$, and the said shafts, near their outer ends, are journaled in boxes secured to the upper rails of the extended portion of the frame-work, as shown. The outer ends of the shafts $g^3$ are provided with crank-arms $g^4$, the ends of which are loosely secured in elongated closed slots $g^5$, formed along the central portions of the operating-arms $g^6$. The lower ends of the arms $g^6$ are pivoted to the outside of the extended portion of the main frame near the base, and the upper ends of said operating-arms are connected with the carriages by the rods $g^7$, each operating-arm being connected with the end of the carriage opposite the movable dog, as shown in the drawings. Two clutches, $g^8$, are secured on the shafts $g^3$, so as to rotate with them while having free sliding motion on them, each being provided with a locking-lug, $g^9$, on its side, which lugs are adapted to engage similar lugs or shoulders formed on the outer ends of the hubs of the wheels $g'$. The clutches $g^8$ are provided with sleeves $z^7$, which extend into the hubs of the wheels $g'$, and on which the wheels $g'$ freely rotate when unlocked from the clutches, and are held in contact with the hubs by the tension of the springs $h$, secured to the upper rails of the extended portion of the frame A, the ends of the springs partially embracing the shafts $g^3$. Shifting-levers or clutch-operating arms H are hinged to the middle cross-girder on the end of the frame A, the ends of the arms H being provided with an upper and lower jaw, $h'$, each provided with a tooth, $h^2$, adapted to engage a circular groove in the face of clutch. The arms H are squared and provided with sleeves $h^3$, constructed to fit and slide thereon, or the arms might be round and the sleeves held against rotation therein by feather and groove. The sleeves $h^3$ are provided with inwardly-extending lugs $h^4$ on their ends, which lugs are constructed to engage cam projections $h^5$ on the outsides of the wheels $g'$, when the sleeves are slid forward on the arms H, and thereby throw the clutches out of engagement with the hubs. The sleeves $h^3$ are operated by longitudinally-extending connecting-rods $h^5$, which articulate with operating-levers $h^6$, extending transversely across or partially across the frame, and terminating in handles within convenient reach of the right and left hands of the operator. The sleeves $h^3$ are, furthermore, held out of engagement with the cams on the wheels $g'$ by means of springs $h^7$, which act upon the levers $h^6$, as shown. The oblique shafts $g^3$ are further provided with adjustable collars $h^8$, to hold the shafts against lateral play, and the inner ends of the hubs of the wheels $g'$ are grooved to receive the edges of the guides $h^9$, for preventing lateral play of the said wheels. The guides $h^9$ are rigidly secured to the end of the support $f^8$. It will be observed that the spreading apart of the stringers at the base of the extended portion of the frame A admits of a large pulley for operating the feed, and thereby avoids the use of a double set of pulleys to transmit the rapid motion of the arbor to carriages and give them the reduced and most advantageous motion, and also tends to give the carriages a steady movement. The rotation of the pulley G, driven by the pulley $f'$ or $f^2$ on the arbor, will cause the wheels $g$ to rotate in opposite directions, and the clutches, being locked to the hubs of said wheels, the carriages will be reciprocated.

When the operator desires to stop one of the carriages to place a block or adjust the tilt-table, he moves the lever which operates the sleeve on the clutch-operating arm, disengaging the clutch and allowing the wheel $g'$ to rotate idly until again locked to the shaft. Thus either one or both of the carriages may be stopped and started at pleasure. It will be observed, further, that when the shingle-bolt is held between the dogs the thrust of the saw will press the bolt toward the side of the carriage which is provided with the stationary dog, and the friction between the carriage and the way on that side will be much greater than on the other, and the rod connecting the carriage and operating-arm must run from this side of the carriage in order to avoid a tendency to bind and cramp the carriage. By my improved mechanism for operating the movable dog the engagement of the crank-arm with the cam $b^8$ is on a direct line with the draft and resistance on the carriage, and therefore causes the slightest possible hinderance. A belt-tightener, consisting of a loose pulley, K, mounted on a vertical axle, $k$, secured in a rectangular-shaped sliding frame, $k'$, bears against one part of the feed-belt and is operated by an upright lever, $k^2$, pivoted to the side of the frame A. The sliding frame $k'$ is secured between the lower and middle cross-girder on the main frame, and the operating-lever is provided with a dog, $k^3$, which engages a rack-bar, $k^4$, secured to the main frame near the top and locks the pulley K in the required adjustments. A short rod, $k^5$, connects the sliding frame $k'$ with the lower end of the operating-lever.

The general construction of the tilt-table is the same as that fully explained in Letters Patent No. 236,620 granted me. I have, however, provided improvements in the means for adjusting and automatically operating the tables, as follows: The oscillating sides $l$ of the tables are each provided with an adjusting-screw, $l'$, near the outer ends, which bear against spring-metal plates or strips $l^2$, also secured to the ends of the sides $l$, the opposite sides of the plates or strips $l^2$ resting in contact with a series of cam projections, $l^3$, on the sides of the wheels $l^4$. The cam-wheels $l^4$ are rigidly secured on the opposite ends of a rotary shaft, $l^5$, journaled in extended arms on the end of the table, the central portion of said shaft carrying a ratchet-toothed wheel, $l^6$. An angle-lever, $l^7$, is also pivoted on the shaft $l^5$, the handle of the lever extending upward and adapted to engage a depending projection, $l^8$, on the side of the carriage. The lower end of the lever $l^7$ is provided with a spring-pressed pawl, $l^9$, pivotally secured thereto, and constructed to engage the notches on the wheel $l^6$. A guide-arm, $m$, is pivoted to the end of the tilt-table and extends downward alongside of the wheel $l^6$, and is provided with a slot, $m'$, in its lower end which receives a crank-arm, $m^2$, on the end of an operating-rod, $m^3$. The guide $m$, when swung toward the periphery of the wheel $l^6$, supports the end of the pawl $l^9$ and prevents the same from engaging the notches on the said wheel. The notches on the wheel $l^6$ correspond alternately to the cams on the wheels $l^4$—that is, there is a notch on the wheel $l^6$ for every cam projection and depression on one of the wheels $l^4$. A single adjusting-screw, N, is vertically secured in a projection, $n$, on the upper end of the post and engages a threaded perforation in the bottom of the tilt-table, and adjusts the same to regulate the thickness of the butts, while the screws $l'$ will determine the thickness of the points.

The operation of the tilt-table is as follows: As the carriage nears the limit of its return movement, it engages the lever $l^7$, and thereby causes the wheel $l^6$ to rotate one notch. This amount of rotation will carry the bearing-plate $l^2$, resting on a cam projection, past the projection and allow it to fall into the recess, and will carry the opposite plate $l^2$ from a recess onto a projection, thereby regulating the bolt for the cut of a shingle with butt and point reversed from the previous shingle cut. If, however, it is at any time desirable to cut several shingles with butts the same way, the guide-arm $m$ may be thrown outward and the pawl $l^9$, thereby prevented from engaging the wheel $l^6$, and the cut will continue to be the same until the pawl is allowed to engage the wheel $l^6$ again. By the above arrangement I am enabled to make any of the required adjustments by the use of a single screw, while in machines hitherto constructed it requires from three to six screws for each of the several adjustments.

To prevent the saw from creeping up, I employ four guides or stealers, O, similar in construction to those fully described in an application for Letters Patent for improvement in shingle-machines, filed May 7, 1884, serial No. 130,656, and now pending, and to which I make no claim, broadly, in my present application, but the mechanism by which these guides are operated and adapted to a double-carriage machine is novel and important. The guides O are pivoted at one end to the upper rails of the frame A, with the other ends in close proximity to the saw-plate.

Rods P are secured to the guides O, one to each, a short distance from the pivoted points, the rods extending toward each other, two on each side of the machine and lapping past each other a short distance. The two rods extending from the same end of the machine are pivoted to the opposite two, a short distance from the ends of the latter, and the ends of the latter are connected to bell-cranks $p$, on a rock-shaft, $p'$, journaled transversely in the upper central portion of the frame A, and operated by a handle, $p^2$. The handle $p^2$ is pivoted to the end of the shaft $p'$ in such a manner that it is capable of a limited rotary motion in the vertical plane of the shaft without disturbing the shaft, but when moved in a plane transverse to the shaft carries the shaft with it. A small bracket, R, provided with two or more sets of adjusting-screws receives the handle $p^2$, and holds the guides O in the different adjustments required for different saws. The outer sides of the ways are provided with laterally-extending flanges S. To one of these flanges the sawdust-spout T is detachably secured in the following manner: The lower inside edge, $t$, of the spout rests flush against the upper rail of the frame, and a portion of the upper edge, $t'$, of one end of the spout takes under the edge of the flange S. The upper inside edge of the spout conforms to and rests against the edge of the flange S, and is provided with lips $t^3$, which extend a short distance over the edge of the flange. The flange S is provided with three studs or pins, $t^4$, set near the edge, the two outside pins being set at such a distance apart that they will engage the outer edges of the lips $t^3$, and thereby prevent the spout from longitudinal play on the flange. A small disk, $t^5$, provided with a circular recess on its under side, as shown in the drawings, is pivoted eccentrically to the upper inside edge of the spout, and is adapted to receive the central pin, $t^4$, within the said recess when the spout is in position against the flange, and lock the spout securely in position. The disk $t^5$ is further provided with lugs $t^6$ on its upper surface, for convenience in turning. The flange S on the opposite side of the machine, the side occupied by the operator, is provided with a sawdust guard, U, secured to the flange by means of hooks $u$, secured thereto, which lip over onto the flange S and engage the studs or lugs $u'$, formed on the flange in the recesses formed on the under faces of the hooks by sliding the guard U endwise.

It is evident that many slight changes may be made in the construction and arrangement of the several parts above described without departing from the spirit and scope of my invention; hence I do not wish to be understood as limiting myself strictly to the construction herein set forth.

I make no broad claim in this application to pushing-blocks located at right angles to the dogs, as the same are claimed, broadly, in my pending application filed June 8, 1886.

Having fully described my invention, what I claim as new, and desire to secure by Letters Patent, is—

1. In a shingle-sawing machine, the combination, with a machine-frame, a cross-girt secured thereto, and two adjusting-screws secured to said girt, of a saw-arbor journaled at its lower end in an adjustable bearing, and an arbor-box pivotally secured to the adjusting-screws and supporting the upper end of the saw-arbor, substantially as set forth.

2. In a shingle-sawing machine, the combination, with a machine-frame and the cross-girt secured to the frame, of a journal-box adjustably secured within the open center of the sectional cross-girt, and a saw-arbor journaled in adjustable bearings at its lower end and in said journal-box near its upper end, substantially as set forth.

3. In a shingle-sawing machine, the combination, with a machine-frame and a cross-girt secured thereto, of a saw-arbor, an adjustable bearing for supporting the lower end of the saw-arbor, a half box or bearing for supporting the upper end of said arbor, said half box or bearing provided with lugs, and a set-screw supported by said lugs for adjusting the box-sections, substantially as set forth.

4. In a shingle-sawing machine, the combination, with a machine-frame and a saw-arbor journaled at its lower end in adjustable bearings, of a cross-girt, the half box or bearing for supporting the upper end of the saw-arbor pivoted within the open center of the said cross-girt and provided with lugs, and a bail and set-screw for adjusting the box-sections, substantially as set forth.

5. In a shingle-sawing machine, the combination, with a saw and saw-arbor, of a bridge-pot, a sectional box within the bridge-pot, and adjusting-screws for adjusting the box-sections and saw-arbor, one of said screws working within another, substantially as set forth.

6. In a shingle-sawing machine, the combination, with a machine-frame, a saw, and a saw-arbor, of a cross-girder secured to the frame near the bottom thereof, and a sectional bridge-pot, one section of which is formed on the cross-girder, and the other section removably secured against the open end of the stationary section, substantially as set forth.

7. In a shingle-sawing machine, the combination, with a machine-frame and a saw-arbor, of a bridge-pot, the box-sections located therein and supporting one end of the saw-arbor, one of said box-sections having a strap or yoke adapted to encircle the other section, screws for adjusting the box, and a movable or adjustable bearing supporting the upper end of the arbor, substantially as set forth.

8. In a shingle-sawing machine, the combination, with a saw and a saw-arbor, of a bridge-pot supporting the lower end of the arbor, box-sections, one of which encircles the other, and a screw within a screw, one of which adjusts the box-sections and the other the arbor, substantially as set forth.

9. In a shingle-sawing machine, the combination, with a machine-frame, one or more carriages mounted thereon, and a saw and saw-arbor, of a drive-shaft, a gear-wheel loosely mounted thereon, a clutch for locking the gear-wheel to the drive-shaft, a pinion meshing with the gear-wheel, and devices operated by the gear-wheel for throwing the clutch out of contact with said gear-wheel, substantially as set forth.

10. In a shingle-sawing machine, the combination, with a machine-frame, a saw, and two carriages, of a shaft having a pinion thereon, two shafts located at or near one end of the machine-frame, each shaft carrying a loose gear-wheel, which meshes with the pinion on the first-mentioned shaft, devices connecting the shafts and carriages, and independent clutches provided with a single lug for locking the loose gear-wheel to its respective shaft, whereby either carriage can be started or stopped without effecting the other, substantially as set forth.

11. In a shingle-sawing machine, the combination, with a machine-frame, a saw, and two independent carriages, of two shafts located at or near one end of the machine-frame, a gear-wheel mounted on each shaft, a driving-pinion meshing with both gear-wheels, and devices connecting the shafts and carriages, substantially as set forth.

12. In a shingle-sawing machine, the combination, with a machine-frame, a saw, and two carriages having independent motions, of a driving-pinion, two gear-wheels meshing with said pinion, a crank-shaft operated by each gear-wheel, and two arms driven by the crank-shafts, and respectively connected with the carriages.

13. In a shingle-sawing machine, the combination, with a machine-frame, a saw, and two carriages having independent motions, of two shafts located at or near one end of the machine-frame, each shaft carrying a loose gear-wheel, a single pinion for operating both gear-wheels, clutches for locking the gears to the shafts, and vibrating arms operated by the shafts and connected to the carriages, substantially as set forth.

14. In a shingle-sawing machine, the combination, with a machine-frame, a saw, and a carriage mounted on the frame, of a driving-shaft connected to the carriage, and a gear-wheel locked to the driving-shaft, the said gear-wheel being provided with a device for moving the clutch, whereby the gear-wheel and shaft are disconnected, substantially as set forth.

15. In a shingle-sawing machine, the combination, with a machine-frame, a saw, a carriage, a shaft connected with the carriage, a gear-wheel loosely mounted on the shaft and provided with a clutch-operating device, and a clutch for locking the gear-wheel to the shaft, of an arm connected with the clutch, and a movable sleeve or its equivalent mounted on said arm and adapted to be moved so as to be engaged by the clutch-operating device on the gear-wheel, substantially as set forth.

16. In a shingle-sawing machine, the combination, with a saw and one or more carriages, a driving-shaft for each carriage, a gear for each shaft, a clutch for each gear, and a clutch-operating arm, of a cam or its equivalent secured to or formed integral with the gear wheel or wheels, constructed and arranged to engage a movable sleeve or its equivalent on the clutch-operating arm and thereby disengage the clutch, substantially as set forth.

17. In a shingle-sawing machine, the combination, with a machine-frame, a saw, and two carriages, of two carriage-driving shafts located at or near one end of the machine-frame, a gear-wheel loosely mounted on each shaft, a single pinion meshing with both gear-wheels, clutches for locking the gear-wheels to their respective shafts, devices for moving the clutches, and springs secured to the machine-frame and bearing against the clutches for the purpose of holding the latter in contact with their respective pinions, substantially as set forth.

18. In a shingle-sawing machine, the combination, with a machine-frame, a carriage, and a saw, of a movable dog mounted on the carriage, and a sliding rod mounted in bearings formed in one end of said carriage and connected to said movable dog, and having a motion parallel to the motion of the dog, substantially as set forth.

19. In a shingle-sawing-machine carriage, the combination, with the movable dog, of an operating-rod seated in bearings formed in the carriage and connected to the movable dog, and provided at its free end with an anti-friction roller adapted to engage a cam or incline on the way and operate the dog, substantially as set forth.

20. In a shingle-machine, the combination, with a carriage provided with a stationary and a movable dog, the movable dog being operated from the stationary dog side of the carriage, of a carriage-driving rod connected to the stationary dog side of the carriage, substantially as set forth.

21. In a shingle-machine, the combination, with a carriage, of a movable dog mounted on said carriage, a stationary dog, and a spring-catch or its equivalent for adjustably securing the stationary dog to the carriage.

22. In a shingle-sawing machine, the combination, with a saw and a carriage adapted to carry a shingle-bolt over the saw, of a wooden block adjustably secured to the front or saw side of the carriage and projecting below said carriage.

23. In a shingle-sawing machine, the combination, with a saw and a carriage adapted to carry the shingle-bolt over the saw, of vertically-adjustable blocks located in either one or both of the dogs in front of binding-faces of said dogs, and at right angles to said binding-faces.

24. In a shingle-machine, the combination, with a carriage adapted to carry a shingle-block over a saw, of an adjustable block secured to the front or saw side of the carriage-frame, the lower end of the block engaging the saw-plate, in the manner and for the purpose substantially as set forth.

25. In a shingle-machine, the combination, with a tilt-table having two independently-oscillating sides and adjusting-screws attached thereto, of intermittently-rotating cam-wheels bearing against the screws and alternately elevating and disengaging the sides, substantially as set forth.

26. In a shingle-machine, the combination, with a carriage having a depending lug or arm, of a tilt-table, cams for tilting the table, and a cam-operating arm actuated by the depending lug or arm of the carriage, substantially as set forth.

27. The combination, with a tilt-table having independently-oscillating sides, and cam-wheels adapted to tilt the sides, of an operating-arm loosely mounted on the cam-wheel shaft, and devices for locking the arm to the shaft, substantially as set forth.

28. The combination, with a tilt-table having oscillating sides, a shaft, cam-wheels mounted on the shaft and adapted to tilt said sides, and a ratchet-toothed wheel secured on the cam-wheel shaft, of an operating-arm loosely mounted on the cam-wheel shaft and provided with a pawl, whereby the arm is locked to the ratchet-toothed wheel and thereby turns the cam-wheels, substantially as set forth.

29. The combination, with a tilt-table having independently-oscillating sides, cam-wheels secured on a shaft adapted to alternately tilt said sides, and a ratchet-toothed wheel secured on the cam-wheel shaft, of an operating arm loosely mounted on the cam-wheel shaft, and provided with a pawl whereby it engages the ratchet-toothed wheel, and an adjustable guide adapted to hold the pawl out of contact with the wheel, substantially as set forth.

30. The combination, with a tilt-table having independently-tilting sides, of a shaft having wheels secured on its ends, said wheels being provided with a series of cams adapted to engage the tilting sides and vertically adjust the same, substantially as set forth.

31. The combination, with a tilt-table having independently-tilting sides operated by a series of cams on a rotating wheel, and set-screws for regulating the amount of tilt, of an intermediate bearing-plate between the ends of the screws and the cams, substantially as set forth.

32. In a shingle-sawing machine, the combination, with a saw, two carriages adapted to feed bolts to said saw, and two or more saw-guides located on opposite halves of the saw, of rods connecting each of the guides with a centrally-located operating-rod, whereby the guides are simultaneously adjusted, substantially as set forth.

33. In a shingle-sawing machine, the combination, with a machine-frame having a laterally-projecting flange and a retaining-pin secured to said flange, of a sawdust-spout, and a rotary cam-disk secured to said spout and engaging the pin and locking the spout to the machine-frame, substantially as set forth.

34. In a shingle-machine, the combination, with machine frame, the saw-supporting frame and centrally located saw, of a vertically-adjustable lift and slide, whereby the saw is raised from the arbor-head and allowed to slide out of position, substantially as set forth.

35. In a shingle-sawing machine, the combination, with a tilt-table having two independently-oscillating sides, of arms secured to said table, a shaft journaled in said arms, and devices connected to said shaft for oscillating the sides.

36. In a shingle-machine, the combination, with a machine-frame, the saw-supporting frame, and centrally-located saw, of a lift operated by a lever, said lift being located beneath the saw and adapted to raise the saw from the arbor-head and hold the same elevated while it is being slid from its position, substantially as set forth.

37. In a shingle-sawing machine, a carriage provided with two pairs of holding-dogs, each pair located on opposite faces or sides of the saw.

38. In a shingle-sawing machine, the combination, with a carriage provided with a movable dog and a rigid dog, of auxiliary dogs located below the saw and connected to said movable and rigid dogs.

39. In a shingle-sawing machine, the combination, with a carriage having a movable dog and a rigid dog, of auxiliary dogs located below and connected to said movable and rigid dogs and provided with sockets, and wooden blocks secured in said sockets.

40. In a shingle-sawing machine, the combination, with a carriage having a movable dog and a rigid dog, of auxiliary dogs located below and connected to said dogs and provided with sockets, and vertically-adjustable blocks located in said sockets.

41. In a shingle-machine, the combination, with a machine-frame, a vertical saw-arbor journaled in said frame, a saw secured to said arbor, and carriages adapted to be moved over the saw, of feed-pulleys secured to the arbor, the internal diameter of one pulley being equal to or greater than the external diameter of another pulley, whereby the greater pulley may be slipped over a lesser, substantially as set forth.

42. In a shingle-sawing machine, the combination, with a machine-frame, a saw-arbor, and saw and carriages, of two feed-pulleys secured on the arbor, one of said pulleys constructed to slip over the other, and devices for securing the outer pulley to the inner pulley or arbor, substantially as set forth.

43. In a shingle-sawing machine, the combination, with a machine-frame, a saw, and two carriages, of a drive-shaft located at one end of the machine and carrying a pinion, two shafts located on opposite sides of the drive-shaft, each of said latter shafts carrying a gear-wheel which meshes with the pinion on the drive-shaft, and the devices, substantially as described, located at the same end of the machine for operating both carriages.

44. In a shingle-sawing machine, the combination, with a machine-frame, one or more carriages mounted thereon, and a saw-arbor, of a drive shaft, a gear-wheel loosely mounted on said shaft, a clutch for locking the gear-wheel to said shaft, an arm, and a movable device thereon adapted to engage a movable cam and thereby separate said clutch from said gear-wheel.

45. In a shingle-sawing machine, the combination, with a machine-frame, one or more carriages mounted thereon, and a saw-arbor, of a drive-shaft, a gear-wheel loosely mounted thereon, a sliding clutch for locking the gear-wheel to the shaft, a spring for holding the clutch in contact with the gear-wheel, an arm engaging the clutch and a movable device on said arm adapted to engage a movable cam for separating the clutch from the gear-wheel.

46. In a shingle-sawing machine, the combination, with a carriage and a saw, of pushing-blocks attached to the carriage and located on the shingle side of the saw, said blocks being in a position to engage the rear edge of the shingle while the latter is being sawed from the bolt or spalt, substantially as set forth.

In testimony whereof I have signed this specification in the presence of two subscribing witnesses.

WILLIS J. PERKINS.

Witnesses:
ARTHUR C. DENISON,
WILLIAM J. TUNMORE.